Dec. 21, 1965  F. HENTSCHEL  3,224,905
TUBES FOR HOLDING THE ACTIVE MATERIAL IN
ELECTRODE PLATES OF GALVANIC ELEMENTS
Filed May 21, 1962  4 Sheets-Sheet 1

INVENTOR:
FRITZ HENTSCHEL

By Erich M. H. Radde

AGENT

Dec. 21, 1965  F. HENTSCHEL  3,224,905
TUBES FOR HOLDING THE ACTIVE MATERIAL IN
ELECTRODE PLATES OF GALVANIC ELEMENTS
Filed May 21, 1962  4 Sheets-Sheet 2

INVENTOR:
FRITZ HENTSCHEL
BY
AGENT

Dec. 21, 1965  F. HENTSCHEL  3,224,905
TUBES FOR HOLDING THE ACTIVE MATERIAL IN
ELECTRODE PLATES OF GALVANIC ELEMENTS
Filed May 21, 1962  4 Sheets-Sheet 3
FIG. 7a
FIG. 7b
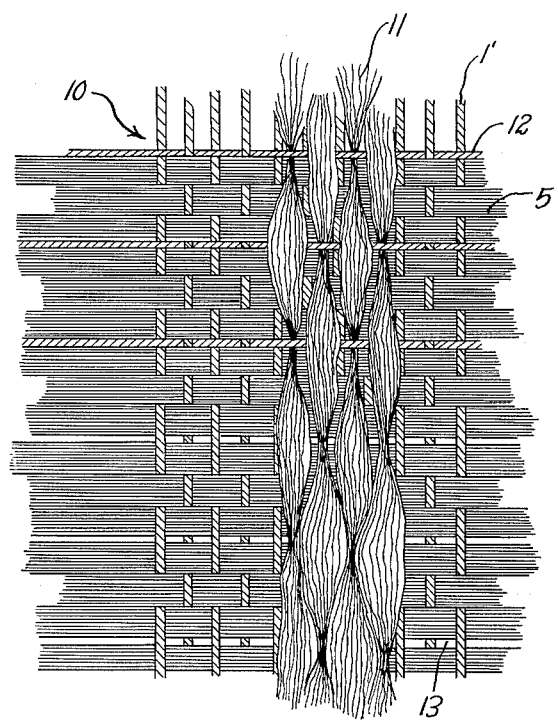
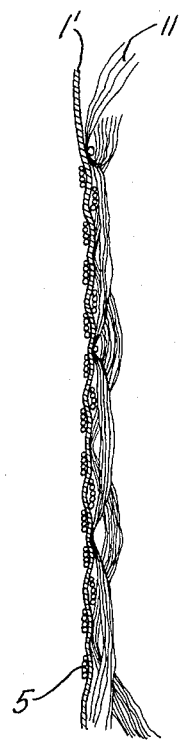
INVENTOR:
FRITZ HENTSCHEL
BY
AGENT

United States Patent Office 3,224,905
Patented Dec. 21, 1965

3,224,905
TUBES FOR HOLDING THE ACTIVE MATERIAL IN ELECTRODE PLATES OF GALVANIC ELEMENTS
Fritz Hentschel, Iserlohn, Westphalia, Germany, assignor to Varta Aktiengesellschaft, Frankfurt am Main, Germany, a corporation of Germany
Filed May 21, 1962, Ser. No. 196,180
Claims priority, application Germany, May 30, 1961, A 37,556
5 Claims. (Cl. 136—55)

The present invention relates to galvanic elements, particularly storage batteries, and especially to an improved material for the tubes of storage battery plates.

Lead-acid batteries with positive plates consisting of vertical tubes within which the active material is contained are well known. The grid of such plates may consist of a number of electrically conductive vertical spines cast integrally with the top bar and burned at the bottom to a bar after the tubes are filled with oxide. The bottom bar may be replaced by a molded plastic bar making a pressed fit with the end of each spine. Each spine forms the core of a pencil consisting of the active material and the enclosing tube. Slots or perforations in the tubes provide access of electrolyte to the active material but prevent the active material from being washed out. The tubes consist of finely slotted rubber or plastic, or like electrically insulating and electrolyte resistant materials. It has also been proposed to use woven fabrics of multi-filament yarns formed of continuous filaments of such materials.

Useful materials of this type are, for instance, polyethylene, polypropylene, polyvinyl chloride, various polyesters, and like synthetic resins well known in this art.

In the manufacture of such woven storage battery plate tubes, the fabric leaves the loom two-dimensional and may then be shaped into the desired tubular form by inserting molding rods thereinto and heating. Many of the useful materials fail to keep their form after shaping so that it becomes difficult to fill the tubes with active material. In such cases, it is necessary to provide a reinforcing medium in the fabric which will impart thereto the required stiffness to keep it in tubular form at least during the filling operation. This medium may form part of the yarns of which the fabric is woven. For instance, when the filaments consist of a copolymer of acrylonitrile and vinylchloride, the yarns may be spun with an intermixture of polyvinylchloride filaments. If the yarns are spun of polyester filaments, the resultant fabric may be coated or impregnated with suitable sizing resins or resin solutions or dispersions, such as phenol-, phenolamide-, vinyl-, urea-, acrylate-, silicon-resins and furthermore modified hydrocarbon compounds, starch, and dextrin.

All such fabrics have a common disadvantage: the sizing media remain in the fabric and close the micropores therein. While they may eventually be decomposed during operation of the galvanic element, such decomposition frequently results in the formation of hydrochloric acid or acetic acid, or chlorine is generated. All of these decomposition products very unfavorably influence the life of the storage battery.

It has also been proposed to make storage battery plate tubes of glass fibers. Such tubes were obtained by a winding process. To maintain such tubes in the desired shape during operation of the battery, the glass fiber tubes must be treated with a bonding medium which must remain on the fibers because the tubes would otherwise lose their rigidity. Thus, the micropores of the tubes are closed again and if the bonding medium is decomposed, the tubes lose their rigidity and burst.

It has been proposed, furthermore, to make such tubes of perforated or slotted plastic sheets and to line their interiors with glass fibers. Here, too, some of the pores of the glass fiber lining are closed, particularly where the glass fiber lining is bonded to the plastic tube.

In all these cases, the access of the electrolyte to the active material during operation of the galvanic element is inhibited.

Woven tubes without linings have relatively large pores but the fabric yarns of conventional type offer considerable resistance to the flow of the electrolyte into the interior of the tubes. In some instances, the resistance is so large that an effective electrolyte flow is altogether impossible. In all the known woven, braided, or knitted fabrics, the meshes are so large that the wash-out of active material from the tubes is considerable. Tubes with braided glass fibers have large openings between the crossing points of the fibers and, particularly because glass fibers slide readily during the manufacture of the tubes, inadmissibly large openings may be formed in the fabric whereby the active material will be rapidly washed out of the plate.

It is the primary object of the present invention to provide a material for galvanic element electrode plate tubes, which permits good electrolyte access to the active material contained therein but effectively prevents it from being washed out prematurely.

The above and other objects and advantages are accomplished in accordance with this invention by providing tubes which consist of a fabric of interwoven warp and filling multi-filament yarns formed of filaments of an electrically insulating and electrolyte resistant material, at least a portion of the yarns consisting of substantially parallel ones of these filaments whereby the latter yarns assume the shape of bands.

These yarns are hardly, or not at all, twisted and will have the shapes of bands when the fabric has been shaped into tubes or tubular pockets on the electrode grids. The width of each such yarn may be five to thirty times the denier of the individual filaments forming the yarn, for instance, of a width between about 3 deniers and about 40 deniers and preferably between about 5 deniers and about 20 deniers.

Very fine, primarily capillary, slots or pores are formed between the filaments or threads of these yarns. Since the yarns have the shape of flat bands, the formation of meshes between the woven yarns can completely be eliminated whereby the woven fabric assumes the form of a microporous filter preventing active material from being washed out of the plate.

Since some electrolyte resistant materials which are otherwise useful for the tubes of this invention are decomposed by nascent oxygen, it is preferred to line the interior of such woven fabrics with glass fibers. In this embodiment of the invention, it is preferred to keep the glass fiber layer in loose contact with the fabric and the glass fibers unidirectionally oriented, preferably in the direction of the vertical spines.

The inner lining of the tube may be introduced therein in the form of a glass fiber tubing in the conventional manner. However, in accordance with a preferred embodiment of the present invention, the glass fiber lining is woven into the tube fabric. With the use of such a double-layer fabric, the inner glass fiber lining will protect the outer plastic tube against nascent oxygen.

According to another preferred feature, the woven fabric is stiffened before the tube is filled with active material by coating or impregnating the fabric with a sizing medium which is soluble in the electrolyte. Preferred sizing media for this purpose are such water-soluble substances as, for instance, starch, dextrin, gelatin, alginate, animal glue, and the like. It is possible to treat either the filaments or the yarns with the sizing medium during or after spinning, particularly if plied yarns made of staple fibers are produced.

After the tubes are filled with active material and their bottom is closed by the bottom bar of the plate, most or all of the sizing medium may be removed from the fabric by immersing the plates in water. Any remaining residue of sizing medium will be washed out during formation of the plates. The resultant plates will have woven tubular enclosures for the active material, the constituent yarns of which define capillary filter openings which are not closed by sizing medium but enable the electrolyte to have free access to the active material while preventing the latter from being washed out of the tubes during operation of the galvanic element.

The above and other objects, advantages, and features of the present invention will be more fully understood when considered in the light of the following detailed description of certain preferred embodiments thereof, taken in conjunction with the accompanying drawings wherein FIG. 1 is a perspective view of a conventional twisted multi-ply yarn;

FIG. 7a is a top plan view of a woven fabric including a glass fiber lining interwoven with the threads of the fabric;

FIG. 7b is a side view of the fabric of FIG. 7a; and

Figure 1:
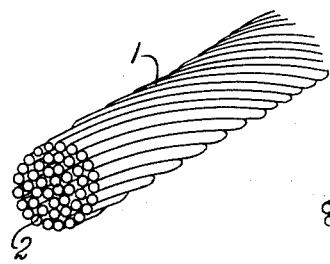

Referring now to the drawings and first to FIG. 1, there is shown a conventional multi-ply yarn 1 consisting of a multiplicity of individual continuous filaments or threads 2. Any filament-forming synthetic resin which is electrically insulating and resistant to electrolytes used in galvanic elements, such as storage batteries, may be used for the filaments if the yarns are to be woven into a fabric used to form tubular pockets for active material in the electrode plate of such an element. Suitable resins include "Dynel" (copolymer of acrylonitrile and vinyl chloride), polyvinyl chloride, "Diolen" (polyester resin), "Trevira" (polyester resin), and like filament-forming thermoplastic resins.

Depending on the material, the multi-filament yarn 1 may consist of about 40 to 60 filaments and may be of about 250 denier. The filaments may be mono-filaments or they may be spun from staple fibers.

As appears clearly from FIG. 1, a twisted yarn constitutes a considerable barrier to the flow of electrolyte therethrough.

Figure 2:
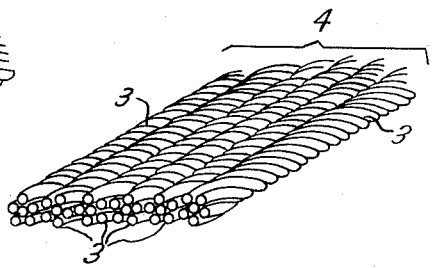
FIG. 2 is a similar view of a band-shaped yarn consisting of a plurality of parallel twisted strands in side-by-side relationship.

In the yarn embodiment of FIG. 2, six twisted strands 3 are arranged in parallel, side-by-side relationship to form the yarn 4. Each of the strands consists of a plurality of filaments and the six strands together are also of about 250 denier, i.e. the same as the twisted yarn 1 of FIG. 1. The resistance of the individual strands to the flow of electrolyte is smaller than in the case of the twisted yarn of FIG. 1 and, in addition, the acid electrolyte may diffuse through the microporous slots between the strands. These slots will usually have a width of no more than a few microns.

Figure 3:
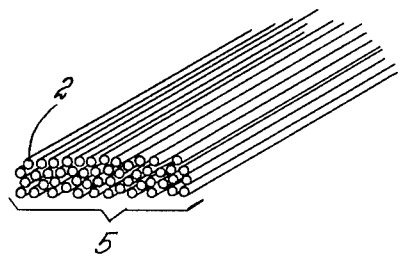
FIG. 3 is a similar view of a band-shaped yarn consisting of a plurality of substantially parallel continuous filaments.

FIG. 3 illustrates the type of threads used in the woven fabric tubes of the present invention. The denier of yarn 5 also is 250 and while, for purposes of illustration, all the filaments 2 are shown to be substantially parallel to one another, it will be understood that, in practice, some of the filaments will cross other filaments to form a yarn of porous structure. It will thus be understood that, whenever the specification or the claims recite yarns consisting of substantially parallel filaments, such yarns include some filaments which cross over other filaments in the yarn.

The pores in the band-shaped yarn 5 are smaller than in yarn 4 of FIG. 2. Some synthetic materials have been spun into filaments of only 2 denier and filaments of 5 denier have been formed into band-shaped yarns of 500 denier. Other useful filament deniers for the production of band-shaped yarns include 20, 50 and 100 denier. A capillary filament or thread of 100 denier has a diameter of about 0.1 mm.

As explained hereinabove, the filaments or the yarns may be sized with any suitable water-soluble sizing medium either before or after weaving.

Figure 4:
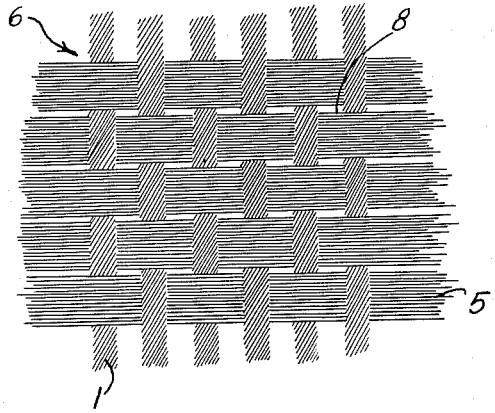
FIGS. 4 to 6 are plan views of three different embodiments of plain weave fabrics incorporating the yarns of FIG. 3.
Figure 5:
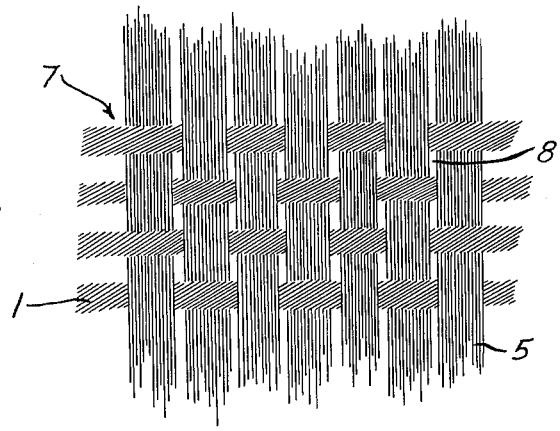
Figure 6:
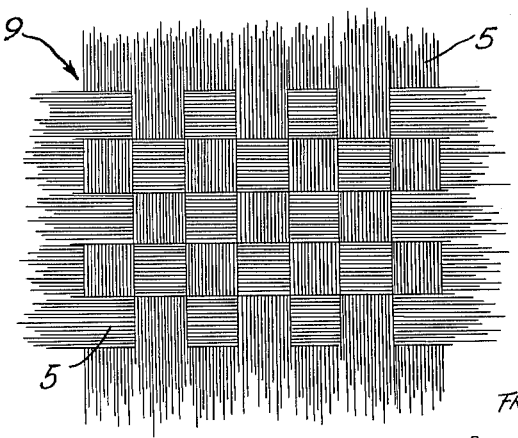

Useful woven fabrics for the purposes of the invention are shown in FIGS. 4 to 6.

In the plain weave fabric 6 of FIG. 4, the warp threads 1 are twisted ply yarns while the filling threads 5 consist of substantially parallel filaments.

In FIG. 5, on the other hand, the plain weave fabric has interwoven warp threads 5 consisting of substantially parallel filaments while the filling threads 1 are twisted ply yarns.

As can be seen from FIGS. 4 and 5, in addition to the microporous openings between the filaments in each band-shaped thread 5, microporous slots 8 are defined between adjacent warp and filling threads in fabrics 6 and 7. When such fabrics are used for tubes in storage battery plates, active material wash-out will be minimized if the slots 8 are arranged horizontally.

The plain weave fabric 9 of FIG. 6 consists of warp and filling threads 5, i.e. no twisted ply yarns are used in this fabric at all. As is clear from the drawing, the use of such band-shaped threads completely eliminates any slots between the individual threads, leaving only the multitude of microporous openings between the filaments of the threads.

FIGS. 7a and 7b illustrate a double-layer woven fabric 10 consisting of an outer layer weave of interwoven band-shaped filling threads 5 and twisted warp ply threads 1' of considerably smaller denier. As in the other fabric embodiments, the filaments of the filling and warp threads consist of a material which is electrically insulating and resistant to the electrolyte. Also as in the other embodiments, the band-shaped threads 5 preferably extend horizontally, i.e. perpendicularly to the vertical spines of the plates.

The fabric 10 includes a glass fiber lining 11 consisting of individual glass fiber bundles. As illustrated, it is preferred to have the glass fibers unidirectionally oriented and in loose contact with the outer layer of the fabric. If, in the finished plate, the band-shaped threads 5 extend perpendicularly to the spine, the glass fibers will extend in the direction of the spine.

The glass fibers in each bundle are generally parallel to each other. They are held on the woven fabric by special filling threads 12 woven into the fabric at given intervals and holding the glass fiber bundles on the fabric at spaced points along the bundles where the bundles are constricted in width.

According to a preferred embodiment, the special filling threads 12 are made of a filament-forming material, such as cotton, linen, alginate which is soluble in the electrolyte. Thus, the filling threads 12 will hold the glass fibers on the fabric until after the fabric tubes are filled with active material but, after the plates are immersed in the electrolyte in the galvanic element, these threads will be dissolved, as shown in the lower part of FIG. 7a, leaving slots 13 between adjacent filling yarns 5. These slots, however, will be covered by the glass fiber bundles.

Figure 8:
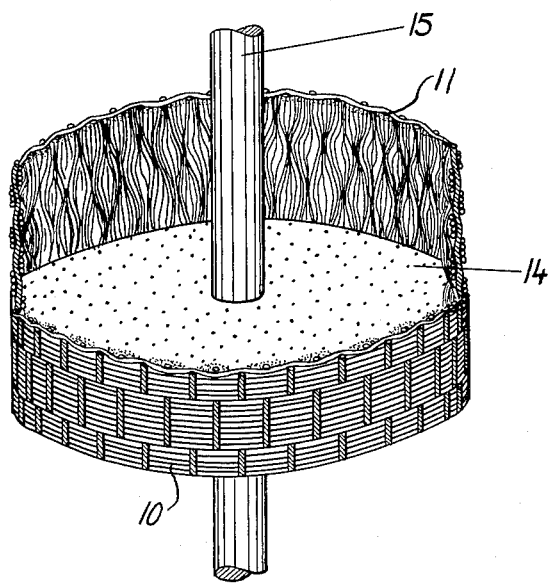
FIG. 8 is a vertical section of a portion of an electrode plate comprising a woven tube containing active material.

FIG. 8 shows the fabric of FIGS. 7a and 7b used in tubular form on a galvanic element electrode plate, such as a positive plate of a lead-acid storage battery, to contain active material 14, such as conventional lead oxides. The active material will hold the glass fiber lining against the woven tube and surrounds the vertical spine 15 of electrically conductive material.

While the invention has been described in connection with certain preferred embodiments thereof, it will be clearly understood that many variations and modifications may occur to the skilled in the art without departing from the spirit and scope of this invention, as defined in the appended claims.

I claim:

1. A storage battery plate comprising an electrically conductive spine, a woven tube surrounding the spine, a pencil of active material around the spine and enclosed by the tube, and the tube consisting of a fabric of closely interwoven warp yarns and multifilament filling yarns, said warp and filling yarns being formed of filaments of an electrically insulating and electrolyte-resistant material, said warp yarns extending in the direction of and said filling yarns extending perpendicularly to the spine, said filling yarns being composed, at given intervals, of filling threads of a filament-forming material being soluble in the electrolyte, said tube further consisting of substantially parallel oriented glass fibers placed on said fabric in the direction of the spine, said glass fibers held by said electrolyte-soluble filling threads on the fabric at spaced points determined by said electrolyte-soluble filling threads, said electrolyte-soluble filling threads being dissolved on immersion of the storage plate into the electrolyte, thereby causing the glass fibers to completely cover the electrolyte-resistant warp yarns and filling yarns and to form a layer of glass fibers on the inside of the tube in contact with the active material, at least a portion of the warp yarns and the filling yarns consisting of substantially parallel ones of said filaments whereby said portion of the yarns assumes the shape of bands.

2. The storage battery plate of claim 1, wherein said fabric is a plain weave fabric and the warp yarns consist of substantially parallel filaments while the filling yarns are twisted ply yarns.

3. The storage battery plate of claim 1, wherein said fabric is a plain weave fabric and the filling threads consist of substantially parallel filaments while the warp threads are twisted ply yarns.

4. The storage battery plate of claim 1, wherein said fabric is a plain weave fabric and the warp and filling threads consist of substantially parallel filaments.

5. A tubular sheathing for an electrode plate of a galvanic element, said tubular sheating consisting of a fabric of closely interwoven warp yarns and multifilament filling yarns, said warp and filling yarns being formed of filaments of an electrically insulating and electrolyte resistant material, said warp yarns extending in the direction of the axis of the tubular sheathing and said filling yarns extending perpendicularly thereto, said filling yarns being composed, at given intervals, of filling threads of a filament forming material being soluble in the electrolyte, said tubular sheathing further consisting of substantially parallel oriented glass fibers placed on said fabric in the direction of the axis of said sheathing, said glass fibers held by said electrolyte-soluble filling threads on the fabric at spaced points determined by said electrolyte-soluble filling threads, said electrolyte-soluble filling threads being dissolved on immersion of the tubular sheathing into the electrolyte, thereby causing the glass fibers to completely cover the electrolyte-resistant warp yarns and filling yarns and to form a layer of glass fibers on the inside of the tubular sheathing, at least a portion of the warp yarns and the filling yarns consisting of substantially parallel ones of said filaments whereby said latter yarns assume the shape of bands.

References Cited by the Examiner

UNITED STATES PATENTS

| 445,708 | 4/1936 | Chilton | 136—43 |
| 2,981,783 | 4/1961 | Bushrod | 136—146 |
| 3,081,368 | 3/1963 | Wunsche | 136—43 |
| 3,097,975 | 7/1963 | Horn et al. | 136—146 |

FOREIGN PATENTS

| 1,248,936 | 11/1960 | France. |
| 482,809 | 4/1938 | Great Britain. |
| 637,167 | 5/1950 | Great Britain. |
| 829,725 | 3/1960 | Great Britain. |

WINSTON A. DOUGLAS, *Primary Examiner.*

JOHN H. MACK, *Examiner.*